(12) United States Patent　　(10) Patent No.:　US 12,576,346 B2

Malaret　　(45) Date of Patent:　　Mar. 17, 2026

(54) PHASE SEPARATING TUBE

(71) Applicant: FJM Innovations Ltd, London (GB)

(72) Inventor: Francisco Malaret, London (GB)

(73) Assignee: FJM INNOVATIONS LTD, London (GB)

( * ) Notice: Subject to any disclaimer, the term of this patent is extended or adjusted under 35 U.S.C. 154(b) by 1111 days.

(21) Appl. No.: 17/420,121

(22) PCT Filed: Jan. 6, 2020

(86) PCT No.: PCT/GB2020/050015

§ 371 (c)(1),
(2) Date: Jun. 30, 2021

(87) PCT Pub. No.: WO2020/141332

PCT Pub. Date: Jul. 9, 2020

(65) Prior Publication Data

US 2022/0080334 A1　　Mar. 17, 2022

(30) Foreign Application Priority Data

Jan. 4, 2019　(GB) ..................................... 1900101

(51) Int. Cl.
B01D 17/02　　(2006.01)
B01L 3/00　　(2006.01)

(52) U.S. Cl.
CPC ........ B01D 17/0214 (2013.01); B01L 3/5021 (2013.01); *B01L 2300/042* (2013.01); *B01L 2300/0832* (2013.01); *B01L 2300/0851* (2013.01); *B01L 2400/0644* (2013.01); *B01L 2400/065* (2013.01)

(58) Field of Classification Search
CPC ....... B01L 2300/042; B01L 2400/0644; B01L 2400/065
See application file for complete search history.

(56) References Cited

U.S. PATENT DOCUMENTS

| 3,257,170 | A | 6/1966 | Marcus et al. |
| 3,661,265 | A | 5/1972 | Greenspan |
| 4,425,235 | A | 1/1984 | Cornell et al. |
| 5,055,203 | A | 10/1991 | Columbus |
| 2017/0120207 | A1 | 5/2017 | Schmidt et al. |
| 2017/0291489 | A1 | 10/2017 | Jacksteit et al. |

FOREIGN PATENT DOCUMENTS

| CN | 105312098 A | 2/2016 |
| CN | 205659694 U | 10/2016 |
| CN | 106861786 A | 6/2017 |
| CN | 108479877 A | 9/2018 |

(Continued)

OTHER PUBLICATIONS

Mao et al—CN 105312098 A Fit Translation—Feb. 10, 2016 (Year: 2016).*

(Continued)

*Primary Examiner* — Bradley R Spies
(74) *Attorney, Agent, or Firm* — Alston & Bird LLP

(57)　　　　ABSTRACT

Phase separating tubes for the separation of multiphase systems and/or for separate extraction of immiscible liquids, for example by the use centrifugation. The invention extends to methods of extracting liquids from multiphase systems.

13 Claims, 11 Drawing Sheets

(56)        References Cited

FOREIGN PATENT DOCUMENTS

EP        0 430 356  A2    6/1991
EP         2883616  A1    6/2015
WO    WO 2020/141332  A1    9/2020

OTHER PUBLICATIONS

PCT/GB2020/060015 International Search Report and Written Opinion mailed Jan. 4, 2020.
PCT/GB2020/060015 International Preliminary Report on Patentability mailed Jun. 16, 2021.
CN Application No. 2020800115066, First Office Action mailed Jun. 22, 2022.
EP Application No. 20 705 779.5, Office Action mailed May 31, 2022.
IN Application No. 202117034985, Hearing Notice mailed Oct. 27, 2023.

\* cited by examiner

PHASE SEPARATING TUBE

CROSS-REFERENCE TO RELATED APPLICATIONS

This application is a national stage entry of PCT/GB2020/050015 filed Jan. 6, 2020, which claims the benefit of GB application no. 1900101.5 filed Jan. 4, 2019.

The present invention relates to phase separating tubes, and in particular to phase separating tubes for the separation of multiphase systems. The invention is particularly concerned with phase separating tubes for separate extraction of immiscible liquids, for example using centrifugation. The invention extends to methods of extracting liquids from multiphase systems.

Liquid-liquid extraction (LLE), also known as solvent extraction and partitioning, is a method used to separate compounds, based on differences in their relative solubilities in two different immiscible liquids. There is a net transfer of one or more species from one liquid into another liquid phase. The solvent that is enriched in the solute(s) is called the "extract". The feed solution that is depleted in the solute(s) is called the "raffinate". Chemical additives can be added to enhance the separation process, such as clarifiers, emulsion breakers, anti-foam, chelating agents and stripping agents.

The batch separation of multiphase systems containing liquids is often carried out with separation funnels which allow the fractionation of the different phases. This is achieved by removing a separated heavy phase(s) from the bottom of the funnel without going through to the lighter, upper phase(s) above the heavy phase(s). However, the use of such funnels is impractical when handling very viscous fluids, which can often remain in the walls of the funnel. Moreover, multiphase systems may not have clear interphases, can form emulsions or require a long time period for the phases to separate after mixing, and so, for such systems, it is often necessary to centrifuge the mixture to force and/or improve the separation. As separating funnels cannot be subjected to centrifugation forces, this is commonly carried out in centrifuge tubes. However, once the centrifugation step is complete, centrifuge tubes do not allow the separation of the phases, and subsequently transferring the separated mixture to a separating funnel cannot be done without re-mixing the phases and generating losses of material that will remain in the tube. Another problem is that separation funnels are not practical for handling small amounts of materials.

There is therefore a need for an improved phase separating tube that will enable batch separation of liquid multiphase systems in a manner that enables the recovery of liquid phases without cross-contamination and sample loss.

Accordingly, in a first aspect of the invention, there is provided a phase separation tube for separating fluids, the tube comprising an inlet and an outlet for fluid, and a cavity for receiving fluid, the outlet interconnected by a first passageway in fluid communication with the cavity through which fluid may flow out of the tube, the tube further comprising a fluid control valve comprising:

i) a second passageway extending substantially transverse to the first passageway and a plug disposed within the second passageway, the plug movable between a valve-closed position in which the plug seals the first passageway, and a valve-open position in which the first passageway is continuous to enable the flow of fluid from the cavity out of the tube; or ii) a plug disposed within the first passageway, the plug further comprising an inlet, outlet and a continuous channel extending therebetween, the plug movable between a valve-closed position in which the plug seals the passageway, and a valve-open position in which the continuous channel is in fluid communication with the first passageway to enable the flow of fluid from the cavity out of the tube.

Advantageously, the tube of the invention is capable of withstanding extreme centrifugation forces without leaking, that will enable recovery of several liquid phases after the centrifugation process, by means of the flow control valve integrated within the lower part of the tube. The phase separation tube provides multiple advantages, for example it minimises human error and sample losses, is capable of resisting extreme centrifugation forces without leaking or tube failure, and is simple to construct and use, so that it can be produced at low cost and be utilised as a lab consumable.

The fluid may be a liquid. Preferably, the fluid comprises at least two immiscible liquids.

The compounds to be separated using phase separation may be metals, organo-metallic compounds, organic compounds, biomolecules or inorganic compounds, such that the material to be separated may be present in one of the immiscible liquids and the remaining material present in another immiscible liquid.

The at least two immiscible liquids may be two immiscible hydrophobic, or non-polar, liquids, such as hydrocarbons, amines, ionic liquids, or non-polar deep eutectic solvents. Alternatively, the at least two immiscible liquids may be a non-polar liquid, such as a hydrocarbon, an amine, an ionic liquid or a non-polar deep eutectic solvent, and a polar liquid, such as water, an alcohol, a hydrophilic ionic liquid or a polar deep eutectic solvent, which are immiscible.

Preferably, opening the fluid control valve enables the flow of phase separated material from the cavity out of the tube.

The tube may have a substantially circular cross-section defining the cavity. The tube may further comprise a base comprising a hemispherical shape with the outlet disposed at the apex of the hemisphere. The base may have a cone shape with the outlet disposed at the apex of the cone. Preferably, the tube has a substantially circular cross-section defining the cavity and a base comprises a tapered portion, tapering inwardly towards the outlet of the tube.

Preferably, the inlet is positioned at or towards the opposite end of the tube to that of the outlet.

Preferably, the first passageway is interconnected to the base of the cavity, along the longitudinal axis of the tube, such that when the valve remains open, substantially all of the fluid will flow from the cavity into the first passageway and out of the outlet of the tube, and little or no fluid will remain in the cavity.

The base of the cavity may be elliptical or conical in shape. Preferably, however, the base of the cavity is hemispherical in shape. Preferably, the first passageway interconnected to the cavity is located at the apex of the base.

Preferably, tube comprises a transparent or translucent material. Preferably, the tube comprises a material selected from a group consisting of: glass, crystal, quartz, synthetic sapphire, a polymer, a fluoropolymer, resin and plastic.

Advantageously, such materials are chemically inert, have good mechanical integrity and enable vitalisation of the interphases between different liquids for proper operation of the separation device.

The plug may be a chemically inert material with good mechanical integrity, such as, a metal, alloy, polymer, resin, ceramic, or plastic.

Preferably the tube and/or plug comprise a plastic, which may be selected from a group consisting of: Polyvinylchloride (PVC), Polyetheretherketone (PEEK), Polysulphone (PSU), Polyphenylsulphone (PPSU), Polyethylene (PE), High Density Polyethylene (HDPE), High Molecular Weight Polyethylene (HMWPE), Ultra High Molecular Weight Polyethylene (UHMWPE), Polypropylene (PP), Polypropylene Homopolymer (PPH), Acetal Copolymer, Acrylic and Polycarbonate.

Preferably, the plug and/or tube comprise a polymer, which may be a fluoropolymer, which may be selected from a group consisting of: Polyvinylfluoride (PVF), Polyvinylidene fluoride (PVDF), Polytetrafluoroethylene (PTFE), Polychlorotrifluoroethylene (PCTFE), Perfluoroalkoxy polymer (PFA, MFA), Fluorinated ethylene-propylene (FEP), Polyethylenetetrafluoroethylene (ETFE), Polyethylenechlorotrifluoroethylene (ECTFE), Perfluorinated Elastomer/Perfluoroelastomer (FFPM/FFKM), Fluorocarbon/Chlorotrifluoroethylenevinylidene fluoride (FPM/FKM), Fluoroelastomer/Tetrafluoroethylene-Propylene (FEPM), Perfluoropolyether (PFPE), Perfluorosulfonic acid (PFSA) and Perfluoropolyoxetane.

Preferably, the plug and/or tube comprises or is made of PEEK, PTFE or PFA.

In one embodiment, the first passageway is defined by a first section extending from the cavity and a second section in fluid connection with the first section, wherein the first and second sections are not coaxial with each other such that the passageway is non-linear. Preferably, the first and the second sections are substantially parallel with the longitudinal axis of the tube. The first passageway may further comprise a junction, fluidly connecting the first and second sections, which junction is substantially perpendicular to the first and second sections.

The term "substantially perpendicular" can mean that the junction may connect with the first section at an angle of about 90° to 180°, 100° to 180°, 110° to 180°, 120° to 180°, 130° to 180°, 140° to 180°, 150° to 180°, 160° to 180°, 90° to 180°, 90° to 170°, 90° to 160°, 10° to 150°, 90° to 160°, 90° to 150°, 90° to 140°, 90° to 130°, 90° to 120°, 90° to 110°, 90° to 100°, 90° to 130°, 100° to 170°, 110° to 160°, 120° to 150°, 130° to 140°, 91° to 179°, 92° to 178°, 93° to 177°, 94° to 176°, 95° to 175°, 96° to 174°, 97° to 173°, 98° to 172° or 99° to 171° to the first section, and at an angle of about 90° to 180°, 100° to 180°, 110° to 180°, 120° to 180°, 130° to 180°, 140° to 180°, 150° to 180°, 160° to 180°, 90° to 180°, 90° to 170°, 90° to 160°, 10° to 150°, 90° to 160°, 90° to 150°, 90° to 140°, 90° to 130°, 90° to 120°, 90° to 110°, 90° to 100°, 90° to 130°, 100° to 170°, 110° to 160°, 120° to 150°, 130° to 140°, 91° to 179°, 92° to 178°, 93° to 177°, 94° to 176°, 95° to 175°, 96° to 174°, 97° to 173°, 98° to 172° or 99° to 171° to the second section.

In another embodiment, the first passageway is linear. Preferably, the passageway is substantially parallel with the longitudinal axis of the tube.

The second passageway may transverse the first passageway at an angle of between 10° to 170°, 20° to 160°, 30° to 150°, 40° to 140°, 50° to 130°, 60° to 120°, 70° to 110°, 80° to 100° or 85° to 95° to the first passageway. Preferably, the second passageway transverses the first passageway at an angle of about 90° to the first passageway.

In one embodiment, the second passageway of the fluid control valve of i) comprises a valve seat and, when in the valve-closed position, the plug sealingly engages the seat, and, when in the valve-open position, the plug is spaced apart from the seat.

Preferably, the plug is moveable by an actuating means. The actuating means may comprise a user's hand or a key, wherein the plug is rotatable about its axis such that, upon rotation of the plug in one direction, the plug moves progressively towards, and eventually into sealing engagement with the seat, and upon rotation in the opposite direction, the plug moves progressively away from the seat. This embodiment may be defined as in FIGS. 1, 2, 3 and FIGS. 6A and B.

Movement of the plug towards and from the seal may be mediated by a screw thread. Preferably, the inner surface of the second passageway comprises a thread that corresponds to a thread disposed on the outer face of the plug.

Preferably, the plug does not extend beyond the wall of the tube. Advantageously, this ensures a homogenous distribution of centrifugal force to avoid leakage, tube deformation or tube failure, when the tube is centrifuged.

The fluid control valve may further comprise a gasket disposed on the plug and/or the valve seat, such that in the valve closed position, the gasket acts to provide an additional seal between the plug and first passageway. Preferably, the gasket is an O-ring.

In an embodiment in which the first passageway comprises a first and second section that are not coaxial with each other and a junction that is substantially perpendicular to the first and second sections, the seat may be comprised within the junction.

In an embodiment in which the actuating means comprises a key, the key may comprise a handle by which the key can be rotated about its axis, and an elongate portion which is engageable with the plug such that, when the handle is rotated in one direction, the plug is rotated such that the plug moves progressively towards, and eventually into sealing engagement with the seat, and upon rotation of the handle in the opposite direction, the plug moves progressively away from the seat. In such an embodiment, the plug may comprise an engagement means to enable the key to engage with and rotate the plug. Preferably, the engagement means is a screw drive. Suitable screw drives will be known to those skilled in the art, such as Slotted, Phillips, Torx, Hex, Socket and Allen screw drives.

In another embodiment in which the first passageway is linear, the plug comprises an inlet, outlet and a continuous channel extending therebetween. The plug may be rotatable about its axis but retained longitudinally such that, upon rotation of the plug, the plug does not move along the second passageway and the plug is rotated such that when in the valve-open position, the channel and first passageway define a continuous passageway from the cavity to the outlet of the tube. This embodiment may be defined as in FIGS. 4 and 5.

Preferably, the plug is rotated by an actuating means. The actuating means may comprise a user's hand or a key. In an embodiment in which the actuating means comprises a key, the key may comprise a handle by which the key can be rotated about its axis, and an elongate portion which is engageable with the plug such that, when the handle is rotated in one direction, the plug is rotated about its axis and when in the valve-open position, the channel and the first passageway define a continuous passageway from the cavity to the outlet of the tube.

The first passageway may be configured to receive a second plug through the outlet, such that the second plug may be disposed within the first passageway to seal the outlet when the fluid control valve is in the closed position, to prevent contaminants from entering the passageway from the outlet. The second plug may be removed when the fluid control valve is opened to enable the flow of fluid from the first passageway out of the tube through the outlet.

In one embodiment of the fluid control valve of ii), the valve seat is disposed in the first passageway and, when in the valve-closed position, the plug sealingly engages the seat.

When in the valve-open position, the plug is spaced apart from the seat. The plug may be rotatable about its axis such that, upon rotation of the plug in one direction, the plug moves progressively towards, and eventually into sealing engagement with the seat, occluding the first passageway, and upon rotation in the opposite direction, the plug moves progressively away from the seat, opening a continuous channel defined by the first passageway and continuous channel extending through the plug.

The fluid control valve may further comprise a gasket disposed on the plug and/or the valve seat, such that in the valve closed position, the gasket acts to provide an additional seal between the plug and first passageway. Preferably, the gasket is an O-ring.

The plug may be movable by an actuating means. The actuating means may comprise a user's hand or a key. In an embodiment in which the actuating means comprises a key, the key may comprise a handle by which the key can be rotated about its axis, and an elongate portion which is engageable with the plug such that, when the handle is rotated in one direction, the plug is rotated such that the plug moves progressively towards, and eventually into sealing engagement with the seat, and upon rotation of the handle in the opposite direction, the plug moves progressively away from the seat. In such embodiment, the plug may comprise an engagement means to enable the key to engage with and rotate the plug. Preferably the engagement means is a screw drive. Suitable screw drives will be known to those skilled in the art, such as Slotted, Phillips, Torx, Hex, Socket or Allen screw drives.

In an embodiment of the fluid control valve of ii), the continuous channel of the plug may comprise a first and second section, wherein the first section extends from the inlet and the second section extends to the outlet. Preferably, the first and second sections are substantially perpendicular to one another such that the channel is non-linear.

The term "substantially perpendicular" can mean that the first and second sections are at an angle of about 90° to 180°, 100° to 180°, 110° to 180°, 120° to 180°, 130° to 180°, 140° to 180°, 150° to 180°, 160° to 180°, 90° to 180°, 90° to 170°, 90° to 160°, 10° to 150°, 90° to 160°, 90° to 150°, 90° to 140°, 90° to 130°, 90° to 120°, 90° to 110°, 90° to 100°, 90° to 130°, 100° to 170°, 110° to 160°, 120° to 150°, 130° to 140°, 91° to 179°, 92° to 178°, 93° to 177°, 94° to 176°, 95° to 175°, 96° to 174°, 97° to 173°, 98° to 172° or 99° to 171° to one another.

Preferably, the second section of the channel is not coaxial with the first passageway and both the second section of the channel and the first passageway are substantially parallel with the longitudinal axis of the tube, such that when the plug is moved progressively away from the seat in a valve-open position, a cavity is formed between the plug and a wall of the first passageway, and a continuous passage is defined from the cavity of the tube, the cavity formed between the plug and the wall of the first channel, and the channel of the plug, such that fluid may flow from the cavity of the tube and out of the outlet of the plug.

In an embodiment of the fluid control valve of ii), the first passageway is defined by first and second sections that are not coaxial with each other such that the passageway is non-linear. Preferably, the second section of the passageway comprises the valve seat and is configured to engage with the plug such that when in the valve-open position, a cavity is formed between the plug and the wall of the second section of passageway, and a continuous passage is defined from the cavity of the tube, the cavity formed between the plug and the wall of the second section of the first passageway, and the channel of the plug, such that fluid may flow from the cavity of the tube and out of the outlet of the plug. This embodiment may be defined as in FIGS. 7, 8 and 9.

Movement of the plug towards and away from the seal may be mediated by a screw thread. The inner surface of the first passageway may comprise a thread that corresponds to a thread disposed on the outer face of the plug. Preferably, the first passageway is defined by at least two sections, and the thread is comprised on the inner surface of the second passageway.

The channel of the plug of ii) may be configured to receive a second plug through the outlet, such that the second plug may be disposed within the channel to seal the outlet when the fluid control valve is in the closed position, to prevent contaminants from entering the channel from the outlet. The second plug may be removed when the fluid control valve is opened to enable the flow of fluid from the channel out of the outlet.

In another embodiment of the first aspect, there is provided a phase separation tube for separating fluids, the tube comprising an inlet for fluid, a cavity for receiving fluid, and a first passageway in fluid communication with the cavity through which fluid may flow out of the tube, wherein the first passageway extends substantially along the longitudinal axis of the tube and having an opening disposed towards the base of the tube and an outlet disposed at or towards the same end of the tube as the inlet, configured to allow fluid to flow from the cavity out of the passageway.

This embodiment may be as defined in FIG. 10 or 11.

Preferably, the first passageway extends substantially along the longitudinal axis of the is tube adjacent to a wall defining the cavity.

The first passageway may further comprise a plug deposed within the passageway, the plug movable between a valve-closed position in which the plug seals the passageway, and a valve-open position in which the passageway is continuous to enable the flow of fluid from the cavity out of the tube. The plug may be disposed towards the inlet or the outlet of the first passageway.

The tube may comprise a fluid control valve comprising second passageway extending substantially transverse to the first passageway and the plug may be disposed within the second passageway, the plug movable between a valve-closed position in which the plug seals the first passageway, and a valve-open position in which the first passageway is continuous to enable the flow of fluid from the cavity out of the tube.

The fluid control valve, second passageway and plug may be as defined herein in the first aspect.

The second passageway may transverse the first passageway at an angle of between 10° to 170°, 20° to 160°, 30° to 150°, 40° to 140°, 50° to 130°, 60° to 120°, 70° to 110°, 80° to 100° or 85° to 95° to the first passageway. Preferably, the second passageway transverses the first passageway at an angle of about 90° to the first passageway.

In one embodiment, the second passageway of the fluid control valve of i) comprises a valve seat and, when in the valve-closed position, the plug sealingly engages the seat, and, when in the valve-open position, the plug is spaced apart from the seat.

Preferably, the plug is moveable by an actuating means. The actuating means may comprise a user's hand or a key, wherein the plug is rotatable about its axis such that, upon rotation of the plug in one direction, the plug moves progressively towards, and eventually into sealing engagement with the seat, and upon rotation in the opposite direction, the plug moves progressively away from the seat. This embodiment may be defined as in FIG. 11.

Movement of the plug towards and from the seal may be mediated by a screw thread. Preferably, the inner surface of the second passageway comprises a thread that corresponds to a thread disposed on the outer face of the plug.

Preferably, the plug does not extend beyond the wall of the tube. Advantageously, this ensures a homogenous distribution of centrifugal force to avoid leakage, tube deformation or tube failure, when the tube is centrifuged.

The fluid control valve may further comprise a gasket disposed on the plug and/or the valve seat, such that in the valve closed position, the gasket acts to provide an additional seal between the plug and first passageway. Preferably, the gasket is an O-ring.

In an embodiment in which the first passageway comprises a first and second section that are not coaxial with each other and a junction that is substantially perpendicular to the first and second sections, the seat may be comprised within the junction.

In an embodiment in which the actuating means comprises a key, the key may comprise a handle by which the key can be rotated about its axis, and an elongate portion which is engageable with the plug such that, when the handle is rotated in one direction, the plug is rotated such that the plug moves progressively towards, and eventually into sealing engagement with the seat, and upon rotation of the handle in the opposite direction, the plug moves progressively away from the seat. In such an embodiment, the plug may comprise an engagement means to enable the key to engage with and rotate the plug. Preferably, the engagement means is a screw drive. Suitable screw drives will be known to those skilled in the art, such as Slotted, Phillips, Torx, Hex, Socket and Allen screw drives.

The flow of fluid from the cavity out of the tube may be performed by use of a fluid extraction means. Thus, preferably, the outlet of the first passageway is configured to receive a fluid extraction means.

The fluid extraction means may be a syringe, pipette, pipette Pasteur or eyedropper. Preferably, the fluid extraction means may be a syringe. The extraction means may comprise a receptacle for receiving the fluid.

The fluid may be retained within the cavity, until engagement of the extraction means with the outlet of the first passageway and the subsequent generation of a negative pressure in the passageway by the extraction means, when compared to the cavity, resulting in the flow of fluid from the cavity, into the first passageway and out of the outlet, preferably into a receptacle comprised within the extraction means.

The tube may have a substantially circular cross-section defining the cavity. The tube may further comprise a base comprising a hemispherical shape with the opening of the first passageway disposed at the apex of the hemisphere. The base may have a cone shape with the outlet disposed at the apex of the cone. Preferably, the tube has a substantially circular cross-section defining the cavity and a base comprises a tapered portion, tapering inwardly towards the outlet of the tube.

The first passageway may have a substantially circular cross-section defining the first passageway. The second passageway may have a substantially circular cross-section defining the second passageway.

The base of the cavity may be elliptical or conical in shape. Preferably, however, the base of the cavity is hemispherical in shape. Preferably, the opening of the first passageway is located towards the apex of the base.

The tube may further comprise a removable cap which is capable of being releasably attached to the inlet of the tube. The cap may comprise a thread on its inner surface that corresponds to a thread on the external surface of the inlet of the tube such that, when the cap is rotated about the inlet, it fits sealingly to prevent liquid disposed in the cavity of the tube from leaking out of the inlet. Preferably, the outer diameter of cap is larger than that of the inlet of the tube.

According to second aspect, there is provided a method of extracting a single fluid phase from an immiscible fluid sample, the method comprising;

i) introducing an immiscible fluid sample comprising immiscible fluid phases to a tube of the first aspect;

ii) mixing the immiscible fluid phases in the tube;

iii) separating the immiscible fluid phases by centrifuging the tube; and iv) extracting a fluid phase separated by step iii) by opening the fluid control valve of the tube to allow a separated fluid phase sample to flow therethrough, and closing the fluid control valve once the separated fluid phase sample has been removed from the tube, thereby extracting a single fluid phase, or by engaging an extraction means with the outlet and generating a negative pressure in the first passageway, when compared to the cavity, resulting in the flow of fluid from the cavity, into the first passageway and out of the outlet of the tube.

The extraction means may be as defined in the first aspect.

The immiscible fluid sample of step i) may be an immiscible liquid sample. Preferably, the sample comprises at least two immiscible fluids.

Mixing step ii) may be performed by shaking, rotating, vortexing and/or by ultrasound.

Preferably, centrifugation of step iii) is performed with a centrifugal force of about 0 g to 25000 g, 10 g to 25000 g, 100 g to 25000 g, 1000 g to 25000 g, 10000 to 25000 g, 0 g to 2000 g, 10 g to 2000 g, 100 g to 2000 g, 100 g to 2000 g, 10000 to 2000 g, 0 g to 15000 g, 10 g to 15000 g, 10 g to 15000 g, 1000 g to 15000 g, 10000 to 15000 g, 0 g to 1000 g, 10 g to 10000 g, 100 g to 10000 g, 1000 g to 10000 g, 0 g to 5000 g, 10 g to 5000 g, 100 g to 5000 g, 1000 g to 5000 g, 0 g to 4000 g, 0 g to 4000 g, 10 g to 4000 g, 100 g to 4000 g, 1000 g to 4000 g, 0 g to 3000 g, 10 g to 3000 g, 100 g to 3000 g, 1000 g to 3000 g, 0 g to 2739 g, 2739 g to 3500 g, 3500 g to 4816 g, 4816 g to 5580 g, 5580 g to 6500 g, 6500 g to 15000 g, 15000 g to 20000 g, 20000 g to 23500 g, 23500 g to 24652 g.

Step iii) may be repeated at least once to enable the extraction of multiple separated fluid phases. Steps i) to iv) may be repeated at least once to extract the same fluid phase multiple times, to maximize recovery of a species with a low partition coefficient.

According to a third aspect, there is provided a use of the tube of the first aspect for separating fluid phases.

Preferably, fluid and tube are as defined in the first aspect.

All of the features described herein (including any accompanying claims, abstract and drawings), and/or all of the steps of any method or process so disclosed, may be combined with any of the above aspects in any combination, except combinations where at least some of such features and/or steps are mutually exclusive.

For a better understanding of the invention, and to show how embodiments of the same may be carried into effect, reference will now be made, by way of example, to the accompanying FIGS., in which.

Figure 1:
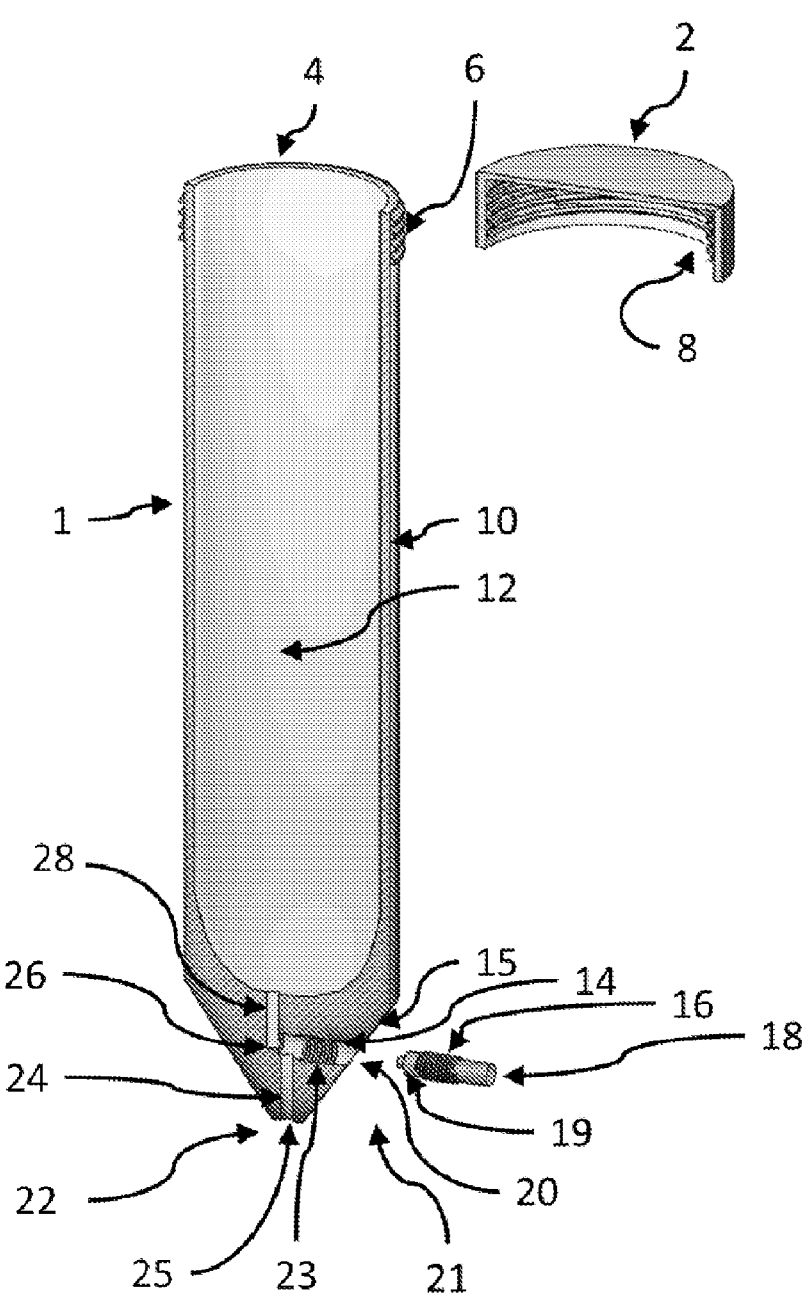
FIG. 1 is a cross-sectional perspective view of a first embodiment of a phase separation tube and associated plug.
Figure 2:
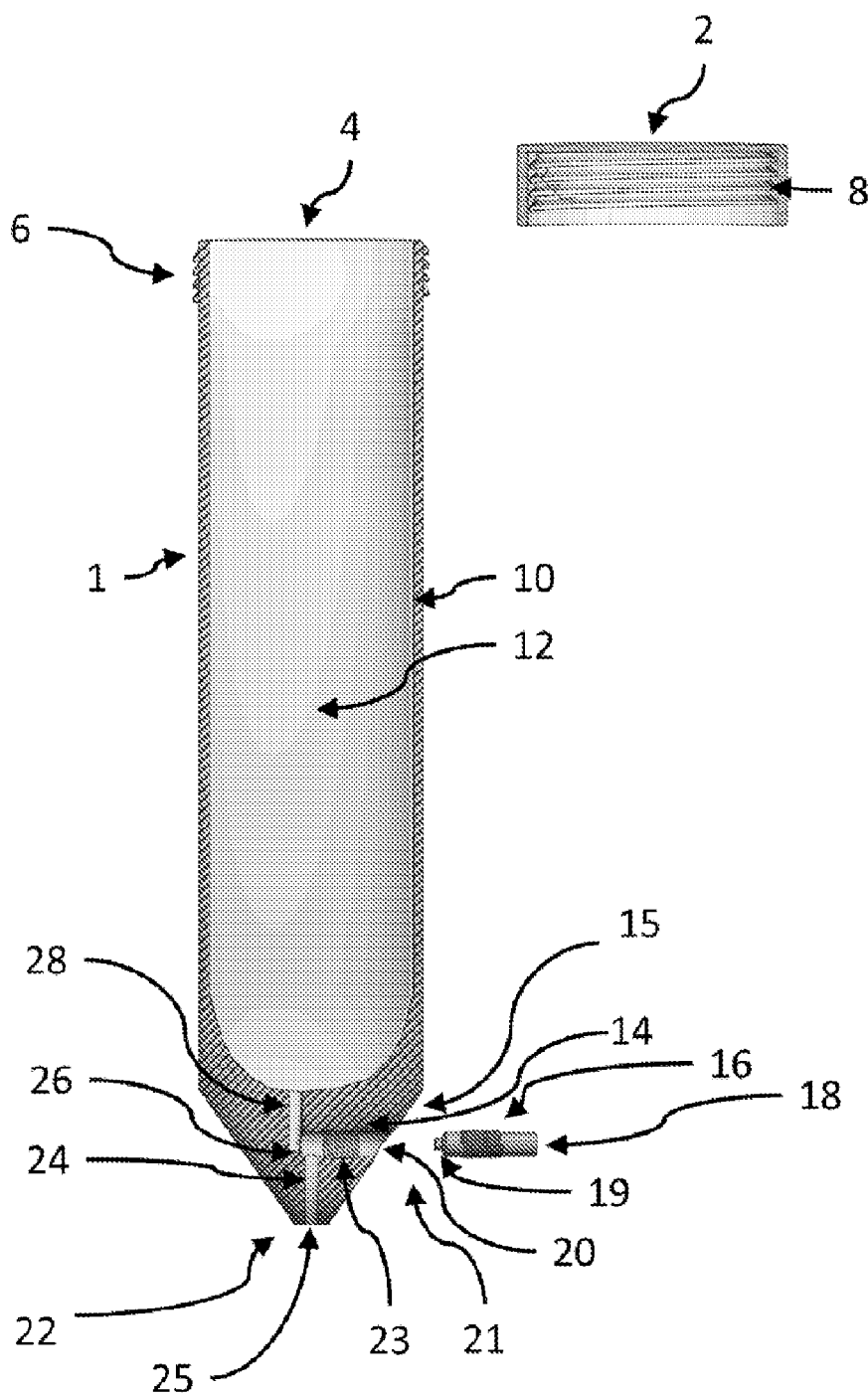
FIG. 2 is a cross-sectional side view of the phase separation tube and plug shown in FIG. 1.
Figure 3:
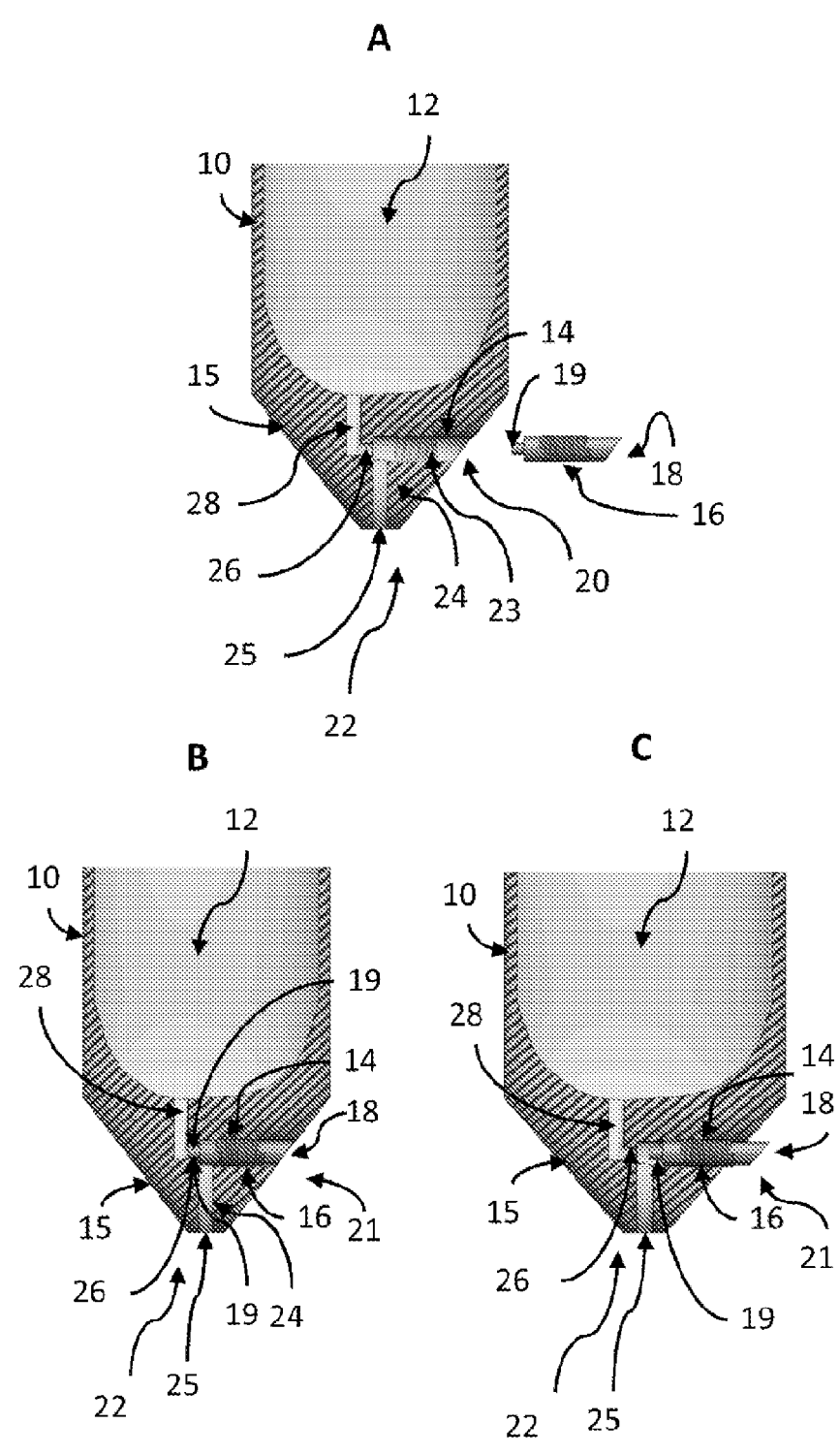
Figure 4:
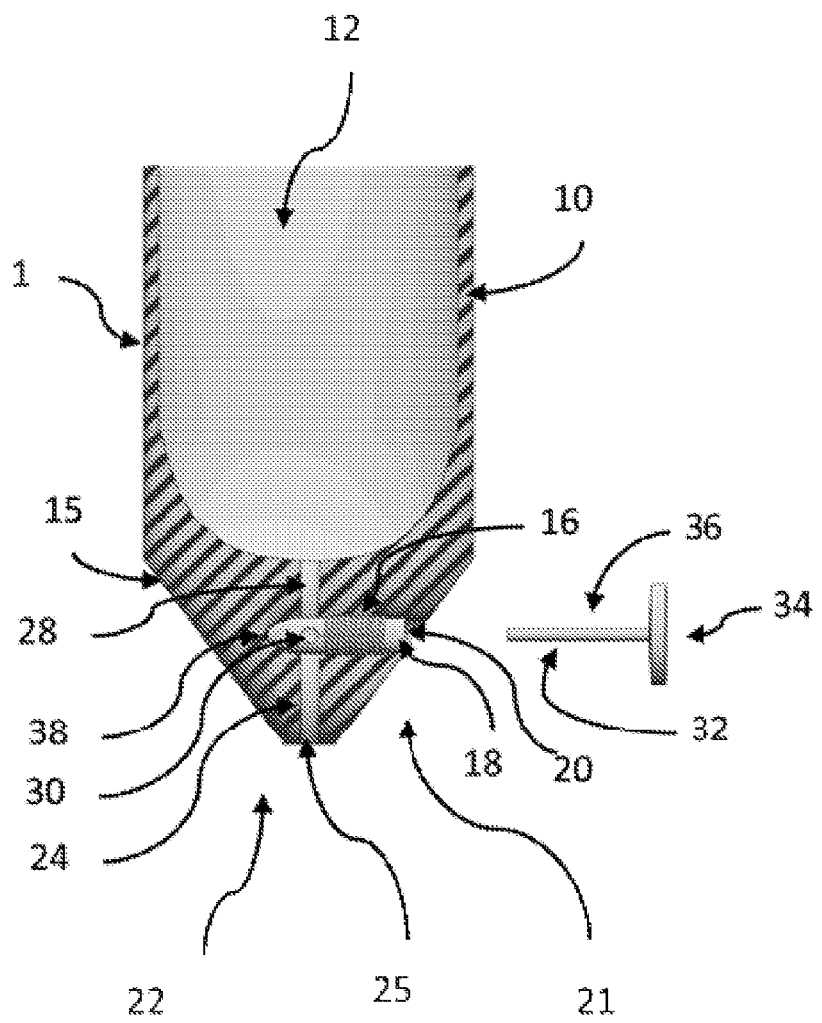
Figure 6:
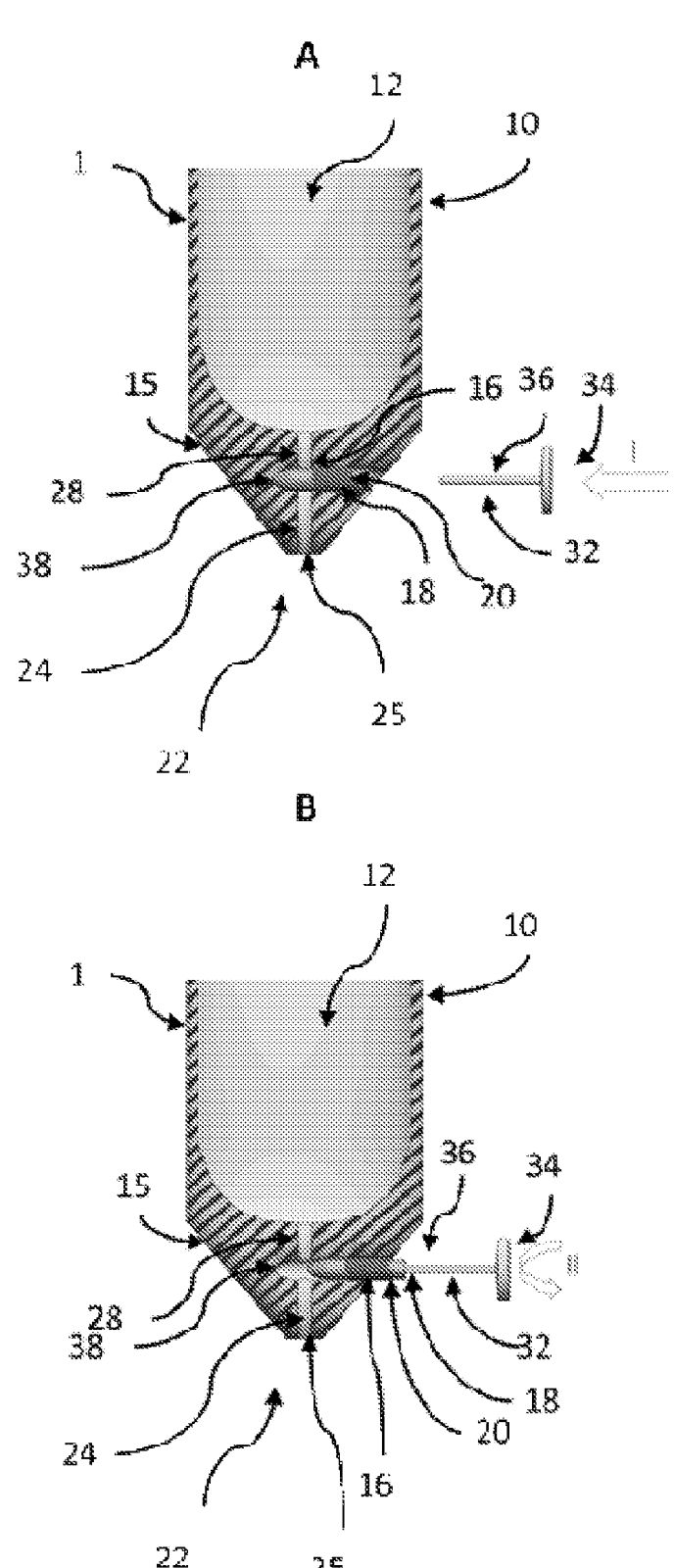
Figure 7:
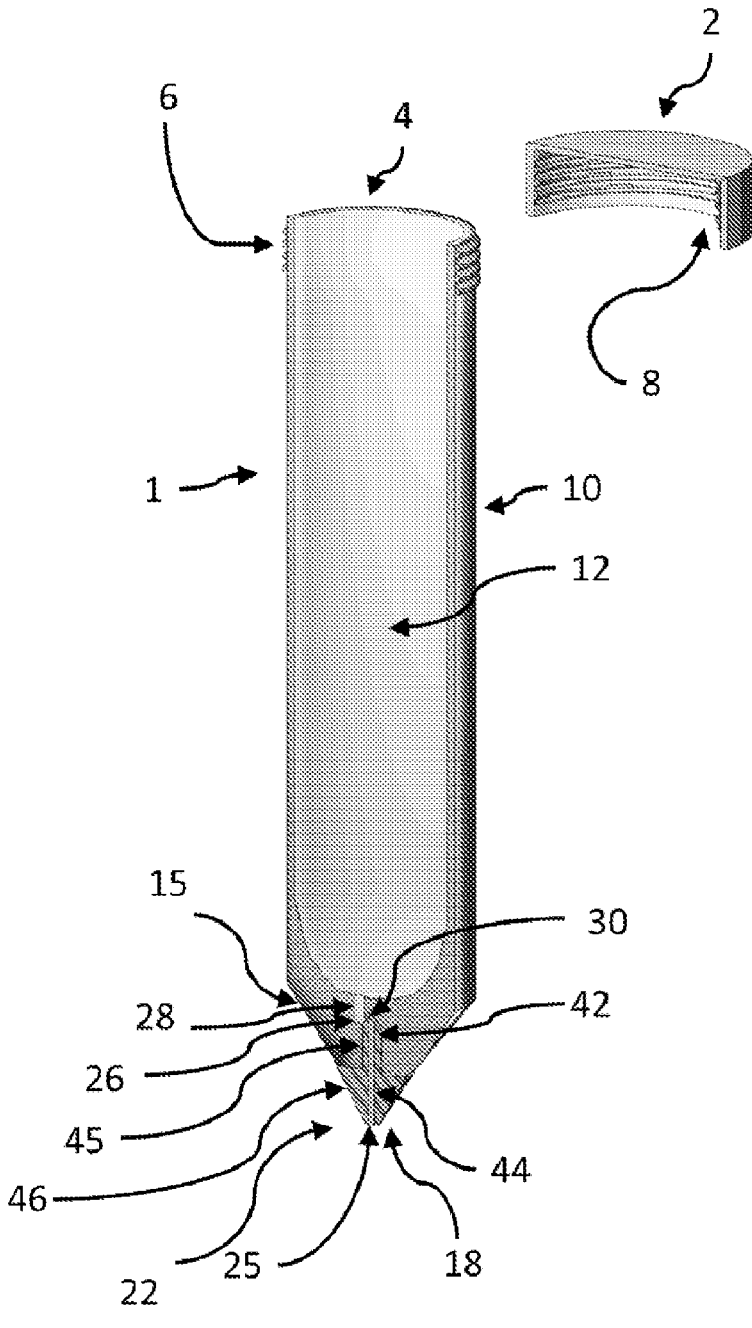
Figure 8:
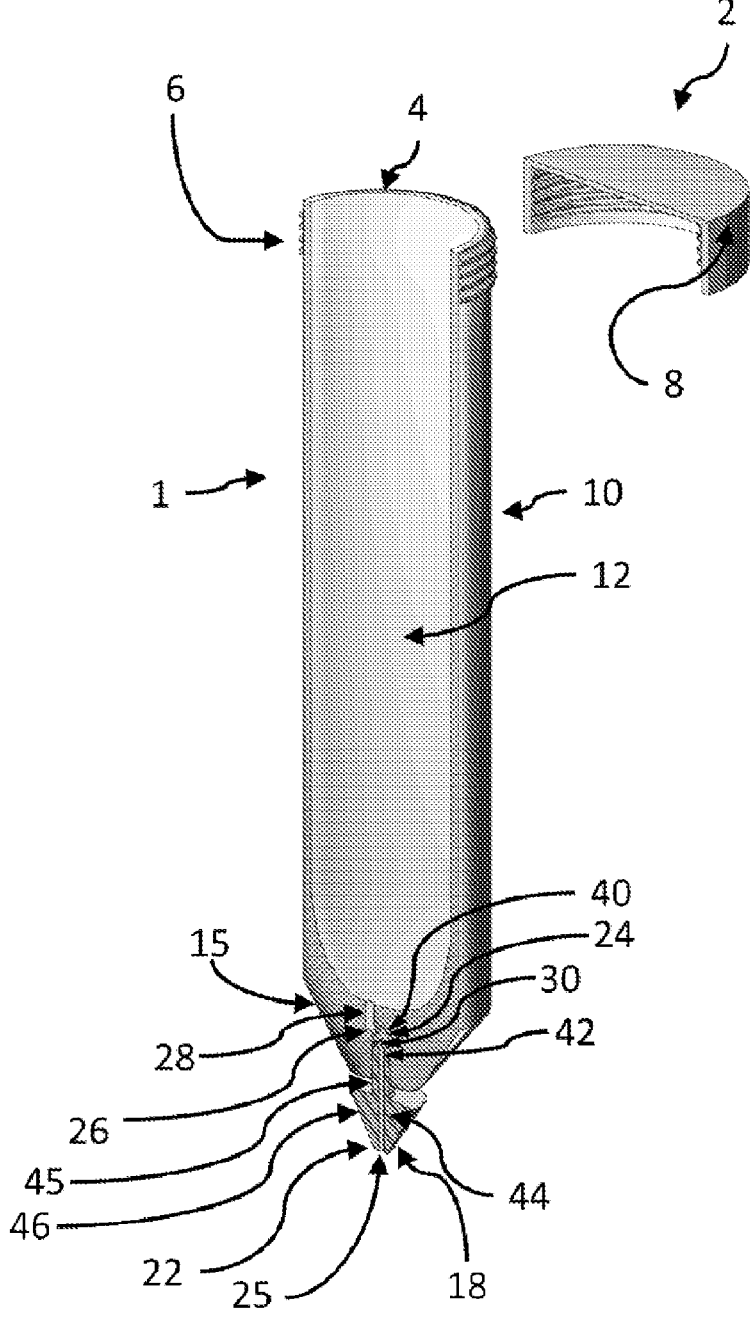

FIGS. 3A to C are enlarged cross-sectional side views of the phase separation tube shown in FIGS. 1 and 2, showing the plug at different positions when in operation, and associated flow of liquid through the tube;

FIG. 4 is an enlarged cross-sectional side view of a second embodiment of the phase separation tube and associated plug, and locking key;

FIGS. 5A and 5B are enlarged cross-sectional side views of the phase separation tube shown in FIG. 4, showing the plug at different positions when in operation, and associated flow of liquid through the tube;

FIGS. 6A and 6B are enlarged cross-sectional side views of a third embodiment of the phase separation tube, showing the plug at different positions when in operation, and associated flow of liquid through the tube;

FIG. 7 is a cross-sectional perspective view of a fourth embodiment of the phase separation tube and associated plug;

FIG. 8 is a cross-sectional perspective view of the phase separation tube and plug shown in FIG. 7; and FIGS. 9A and 9B are enlarged cross-sectional side views of the phase separation tube shown in FIG. 8.

Figure 10:
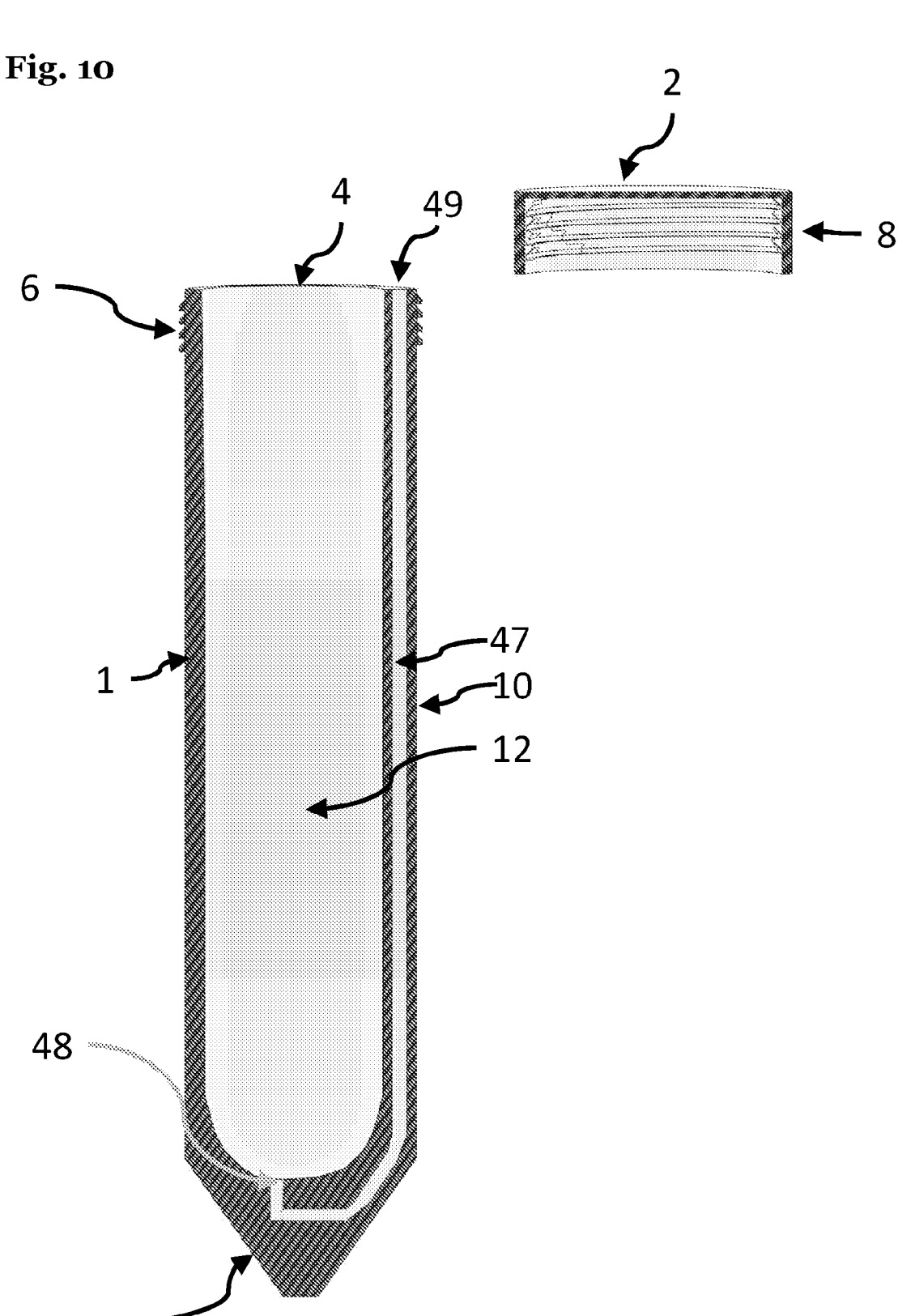

FIG. 10 is a cross-sectional perspective view of another embodiment of a phase separation tube.

Figure 11:
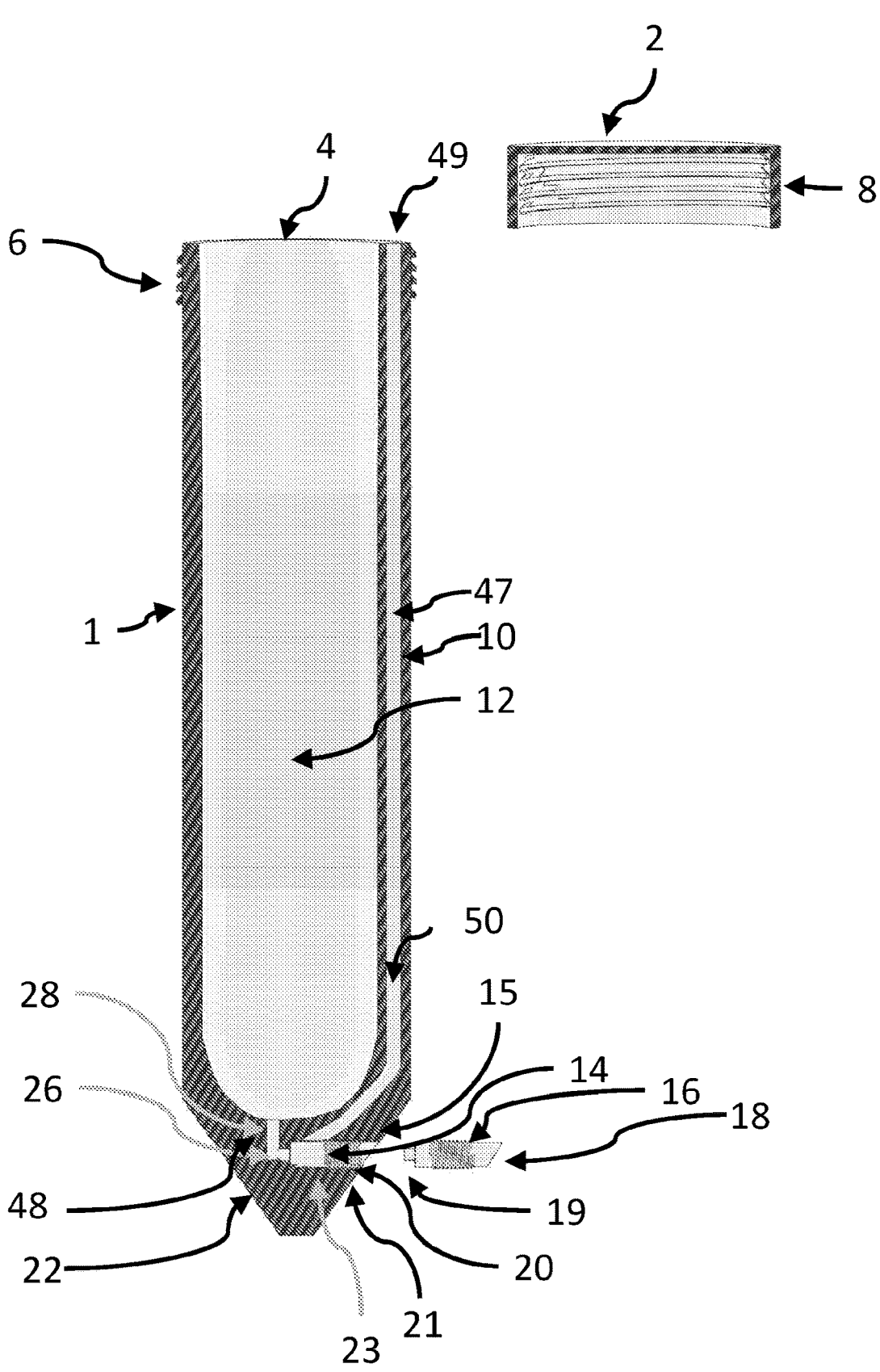

FIG. 11 is a cross-sectional perspective view of another embodiment of a phase separation tube.

EXAMPLE

Referring to the FIGS., there are shown various embodiments of a phase separation tube 1 capable of containing liquid multiphase systems, in particular at least two compounds solubilised in different immiscible liquids, for example one compound solubilised in water and another in an organic solvent. The phase separation tube 1 enables the mixing of the liquid phases, separation by centrifugation and subsequent recovery of the liquid phases, all in a single tube 1, without cross-contamination of the phases, or leaking. The various embodiments of phase separation tube 1 are all very similar except for an elegant plug mechanism 21 by which the different phases can be separated and tapped off (i.e. removed) from the tube 1. The plug 21 prevents leaking under extreme centrifugation forces when in the closed configuration, and enables recovery of separated liquid phases without cross-contamination when in the open configuration.

As shown in FIGS. 1 and 2, the phase separation tube 1 has a circular cross-section defining a cavity 12, and has a base 22 at one end, and is open at the opposite end 4. The tube 1 has a removable cap 2 which can be releasably attached to the open end 4 of tube 1. The cap 2 comprises a thread 8 on its inner surface that corresponds to a thread 6 on the external surface of end 4 of the tube 1, such that when the cap 2 is rotated about the open end 4, it fits sealingly to prevent liquid disposed in the cavity 12 of the tube 1 from leaking out of end 4. The outer diameter of cap 2 is generally larger than that of the open end 4 of the tube 1.

Referring to FIGS. 1, 2 and 3A-C, there is shown a first embodiment of the tube 1 in which the base 22 includes a tapered portion 15 which narrows to a tip 25. A passageway 28, 24 extends from the base of cavity 12 through to, and terminating with, an opening 25. The passageway 28, 24 comprises two shorter sections, 28, 24, which are in fluid communication with each other via a junction 24. The first section 28 and second section 24 both extend in a direction which is substantially parallel with the longitudinal axis of tube 1. However, the first and second sections 28, 24 are not coaxial with each other. The first section 28 leads into the second section 24 via the junction 26, which extends in a direction which is substantially perpendicular to the first and second sections 28, 24. The second section 24 then leads into the opening 25 at the base 21 of the tube 1. Accordingly, the passageway defined by sections 28, 24 and junction 26 is non-linear. A further passageway 14 is in communication with the junction 24, and extends in a direction which is substantially perpendicular to sections 28, 24. The passageway 14 has a larger diameter than that of the each of channels 28, 26, and defines an opening 20 on one side of the tapered portion 15 of the tube ii, which is configured to receive a plug 18. An inner surface of the passageway 14 comprises a thread 23 that corresponds to a thread 16 disposed on the outer face of the plug 18, such that the plug 18 may be placed into passageway 14 and rotated so that it is driven along passageway 14 towards junction 26. The inner end of plug 18 includes a protrusion 19 which engages sealingly with junction 26, to prevent leakage of liquid disposed in the cavity 12 and passageway 28, 24 and out of opening 25, when the tube is centrifuged, as shown in FIG. 3B. The plug 18 can be rotated in the opposite direction to remove the protrusion 19 from sealing engagement with junction 26 and to enable the flow of liquid from cavity 12 through passageway 28, 26 and 24, and out of the tube 1 through opening 25, as shown in FIG. 3C. This enables the recovery of phase-separated material from the tube 1 without mixing or contaminating the phases in cavity 12. The plug 18 can be rotated back to seal the junction 26 and thereby block section 28 once all of one phase has been removed from tube 1, thus enabling the full recovery of separate liquid phases.

Figure 5:
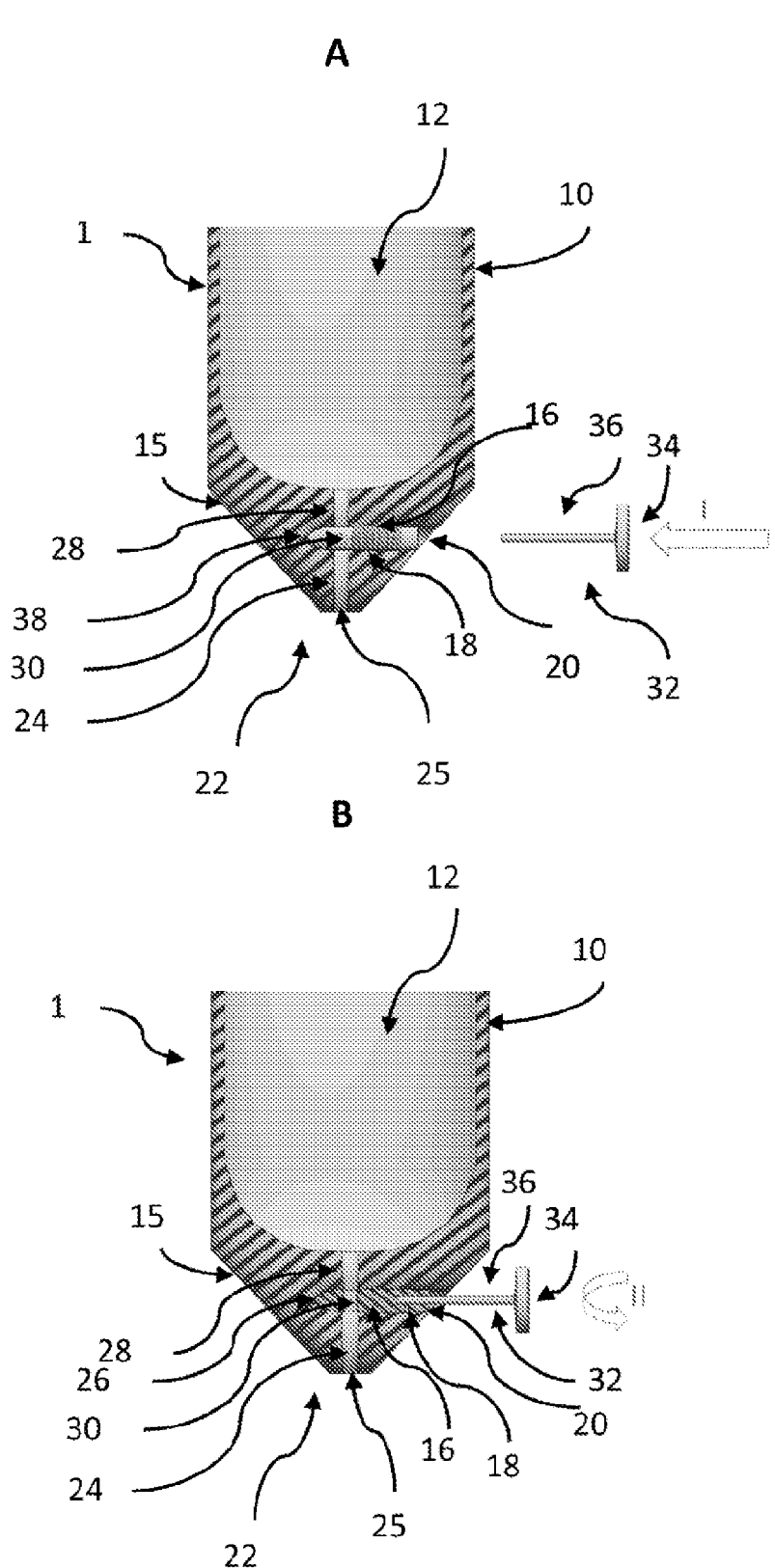

Referring to FIGS. 4 and 5, there is shown a second embodiment of the tube 1. In this embodiment, sections 28 and 24 making up the passageway are coaxial, and extend in a direction which is substantially parallel with the elongate axis of the tube 1, i.e. along the length of the tube 1, from the open end 4 to the base 22. Sections 28 and 24 extend to define an opening 25 on one side of the tapered portion 15 of the tube ii. The plug 18 extends along passageway 38 and has an outer thread 16 which engages with an inner thread of the passageway 38. A channel extends through the length of the plug 18 and maybe accessed, via an opening 30, with an elongate portion 36 of a turning key or tool 32. The key 32 has a handle 34 by which the key and therefore plug 18 can be rotated via screw thread 16, though the plug 18 does not advance in either direction to any great extent. Extending transversely through the plug 18 there is provided a channel 30, such that when the plug is in a closed configuration (see FIG. 5A), channel 30 is not aligned with sections 28 and 24, and the plug 18 blocks the flow of liquid therethrough. Thus, the tube 1 retains liquid in cavity 12 and leakage of the liquid is prevented when is the tube is centrifuged, as shown in FIG. 5A. However, the plug 18 may be rotated in the opposite direction (though the plug 18 stays in the same position) such that that the channel 30 is now aligned with sections 28, 24 to thereby define a continuous passage from cavity 12, through sections 28, 24 to enable the flow of liquid from cavity 12 through passages 28, 24 and out of the tube 1 through opening 25, as shown in FIG. 5B. This enables the recovery of phase-separated material from the tube 1. The plug 18 can be rotated back to seal the continuous passage from cavity 12, though sections 28, 24 once all of one phase has been removed, thus enabling full recovery of separate liquid phases, as shown in FIG. 5B.

Referring to FIGS. 6A and 6B, there is shown a third embodiment of the tube 1 in which the passages 24 and 28 are arranged as described above for FIGS. 4 and 5. A passageway 38 extends substantially perpendicularly across sections 28 and 24 and defines an opening 25 on one side of the tapered portion 15 of the tube ii. Passageway 38 is configured to receive a plug 18, where passageway 38 comprises a screw thread on its inner wall that corresponds to a screw thread 16 on the outer wall of the plug 18. The elongate portion 36 of the key 32 may be engaged with the plug 18 disposed within the passageway 38, and rotated using its handle 34, such that the plug 18 is moved along passage 38 until it blocks and seals the continuous passage from cavity 12 through passage 28, 38 and 24. Hence, tube 1 retains liquid in cavity 12 and prevents leakage of the liquid when the tube 1 is centrifuged, as shown in FIG. 6A. The plug 18 may be rotated in the opposite direction, such that it is moved in the opposite direction along passageway 38 to expose the continuous passage from cavity 12, through passageway 28, 38 and 24 to enable the flow of liquid from cavity 12 through passageways 28, 38 and 24 and out of the tube 1 through opening 25, as shown in FIG. 6B. This enables the recovery of phase-separated material. The plug 18 can be rotated back to seal the continuous passage from cavity 12, through sections 28, 38 and 24 once all of one phase has been removed, thus enabling full recovery of separate liquid phases, as shown in FIGS. 6A and B.

Figure 9:
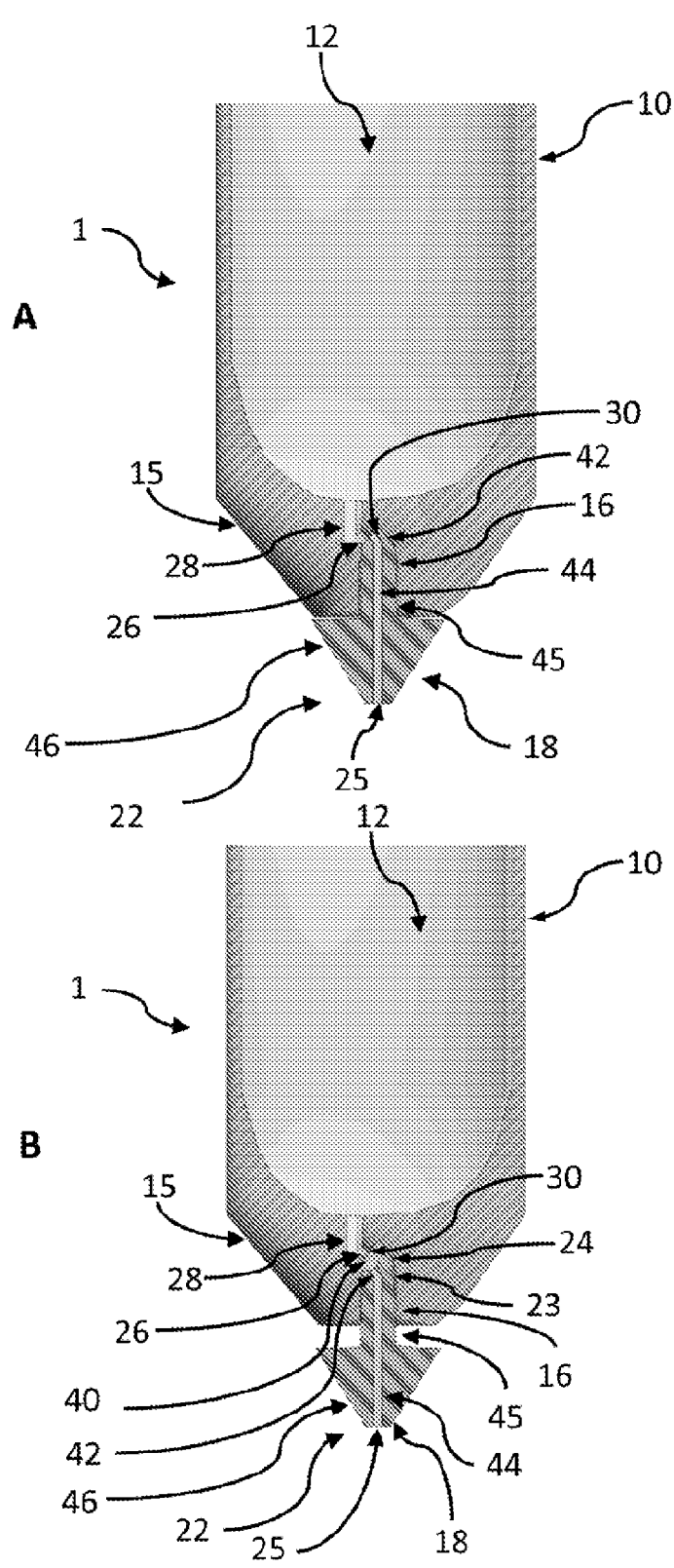

Referring to FIGS. 7-9, there is shown a fourth embodiment of the tube 1 in which sections 28, 26, 24 making up the passageway are in fluid communication with each other such that they together define a continuous passage from cavity 12 to opening 25 at the base 22. Section 28 extends from the cavity 12 towards the base 22 of the tube 1, and is in fluid communication with a shorter section 26 extending substantially perpendicular to the section 28, which in turn is in fluid communication to the section 24, which extends substantially perpendicular to the passage 26, such that passages 28 and 24 extend in a direction which is substantially parallel with the elongate axis of the tube 1, i.e. along the length of the tube 1, from the open end 4 to the base 22 but are not coaxial with one another, and define an opening 25 in the base 22 of the tube 1. The plug 18 comprises sections 42 and 44 that are in fluid communication with each other such that they together define a continuous passage inside the plug 18 from opening 30 to opening 25. Section 42 extends substantially perpendicularly from the tapered portion 46 of the plug 18 and is in fluid communication with section 44 which extends from section 42 in a direction which is substantially parallel with the elongate axis of the tube 1, i.e. along the length of the tube 1, from the open end 4 to the base 22. Section 24 of the passageway is configured to receive elongate portion 45 of plug 18, where section 24 comprises a screw thread 23 on its inner wall that corresponds to a screw thread 16 disposed on the outer wall of the elongate portion 45 plug 18, such that the plug 18 may be rotated by hand such that the plug 18 is moved along passage 24 until it blocks and seals the continuous passage from cavity 12 through passage 28, 26 and 24, and the tapered edge 46 of plug 18 is coaxial and continuous with the tapered edge 15 of tube 1, such that the base 22 is formed by the tapered end of the plug 18, with opening 25 disposed in the base 22. Hence, tube 1 retains liquid in cavity 12 and prevents leakage of the liquid when the tube 1 is centrifuged, as shown in FIG. 7 and FIG. 9A. The plug 18 may be rotated in the opposite direction such that the elongate portion 45 is moved in the opposite direction along a portion of passageway 24 forming a cavity 40 between the plug 18 and the wall of the section 24 that is at the end opposite the opening 25, to expose a continuous passage from cavity 12 through sections 28, 26, cavity 40 and sections 42 and 44, to enable the flow of liquid from cavity 12 through sections 28, 26, cavity 40, into opening 30, through sections 42 and 44 and out of the tube 1 through opening 25, as shown in FIG. 9B. This enables the recovery of phase separated material. The plug 18 can be rotated back to seal the continuous passage from cavity 12 through sections 28, 26, cavity 40 and sections 42 and 44 once all of one phase has been removed, thus enabling full recovery of separate liquid phases.

Referring to FIG. 10 there is shown a fifth embodiment of the tube 1, in which passageway 47 extends along the elongate axis of the tube 1, i.e. along the length of the tube 1, from the open end 4 to the base 22, along the cavity 12 for receiving fluid, from an opening 48 disposed towards the base 22 of the tube 1 to an outlet 49 disposed at the same end of the tube 1 as the inlet 4, such that the passageway 47 is in fluid communication with the cavity 12, to enable the flow of fluid from the cavity 12 out of the tube 1. Tube 1 retains liquid in cavity 12 and prevents leakage of the liquid when the tube 1 is centrifuged. The flow of fluid from the cavity 12 out of the tube 1 may be performed by use of a fluid extraction means, for example a syringe, which generates a negative pressure in the passageway 47, when compared to the cavity 12, resulting in the flow of fluid from the cavity 12 through the opening 48 along the passageway 47 to the outlet 49, to enable the flow of fluid from the cavity 12 out of the tube 1.

Referring to FIG. ii there is shown a sixth embodiment of the tube 1 in which a further passageway 14 is in communication with junction 26, and extends in a direction which is substantially perpendicular to section 28 of passageway 47. Passageway 47 is defined by sections 28 and 50. The passageway 14 has a larger diameter than that of the passageway 47, and defines an opening 20 on one side of the tapered portion 15 of the tube 1, which is configured to receive a plug 18. An inner surface of the passageway 14 comprises a thread 23 that corresponds to a thread 16 disposed on the outer face of the plug 18, such that the plug 18 may be placed into passageway 14 and rotated so that it is driven along section 28 of passageway 14 towards junction 26. The inner end of plug 18 includes a protrusion 19 which engages sealingly with junction 26, to prevent leakage of liquid disposed in the cavity 12 and passageway 47 and out of outlet 49, when the tube is centrifuged. The plug 18 can be rotated in the opposite direction to remove the protrusion 19 from sealing engagement with junction 26 and to enable the flow of liquid from cavity 12, through opening 48 into passageway 47, and out of the tube 1 through outlet 49 by use of a fluid extraction means, for example a syringe, which generates a negative pressure in the passageway 47, when compared to the cavity 12. This enables the recovery of phase-separated material from the tube 1 without mixing or contaminating the phases in cavity 12. The plug 18 can be rotated back to seal the junction 26 and thereby block section 28 once all of one phase has been removed from tube 1, thus enabling the full recovery of separate liquid phases.

Thus, the inventor has devised a tube 1 capable of withstanding extreme centrifugation forces without tube failure or leaking, that will enable recovery of several liquid phases after the centrifugation process, by means of a flow regulating device or valve integrated within the bottom part of the tube 1. The phase separation tube 1 provides multiple advantages, for example it minimises human error and sample losses, is capable of resisting extreme centrifugation forces without tube failure or leaking, and is simple to construct and use, so that it can be produced at low cost and be utilised as a lab consumable.

The invention claimed is:

1. A phase separation centrifuge tube for separating fluids, the tube comprising an inlet and an outlet for fluid, and a cavity for receiving fluid, the outlet interconnected by a first passageway in fluid communication with the cavity through which fluid may flow out of the tube, the tube further comprising a fluid control valve comprising:

i) a second passageway extending substantially transverse to the first passageway and a plug disposed within the second passageway, the plug movable between a valve-closed position in which the plug seals the first passageway, and a valve-open position in which the first passageway is continuous to enable the flow of fluid from the cavity out of the tube; or ii) a plug disposed within the first passageway, the plug further comprising an inlet, outlet and a continuous channel extending therebetween, the plug movable between a valve-closed position in which the plug seals the passageway, and a valve-open position in which the continuous channel is in fluid communication with the first passageway to enable the flow of fluid from the cavity out of the tube, wherein the first passageway is defined by a first section extending from the cavity and a second section in fluid connection with the first section, wherein the first and second sections are not coaxial with each other such that the passageway is non-linear, and wherein the first and second sections are substantially parallel with the longitudinal axis of the tube, and wherein the first passageway further comprises a junction, fluidly connecting the first and second sections, which junction is substantially perpendicular to the first and second sections.

2. The phase separation centrifuge tube according to claim 1, wherein the fluid is a liquid, optionally wherein the fluid comprises at least two immiscible liquids.

3. The phase separation centrifuge tube according to claim 1, comprising a substantially circular cross-section defining the cavity and a base comprising a tapered portion, tapering inwardly towards the outlet of the tube.

4. The phase separation centrifuge tube according to claim 1, wherein the plug is moveable by actuating means, optionally wherein the actuating means comprises a user's hand or a key.

5. The phase separation centrifuge tube according to claim 1, wherein the second passageway of the fluid control valve of i) comprises a valve seat and, when in the valve-closed position, the plug sealingly engages the seat, and, when in the valve-open position, the plug is spaced apart from the seat.

6. The phase separation centrifuge tube according to claim 1, wherein the first passageway of the fluid control valve of ii) comprises a valve seat and, when in the valve-closed position, the plug sealingly engages the seat, when in the valve-open position, the plug is spaced apart from the seat.

7. The phase separation centrifuge tube according to claim 6, wherein the plug is rotatable about its axis such that, upon rotation of the plug in one direction, the plug moves progressively towards, and eventually into sealing engagement with the seat, occluding the first passageway, and upon rotation in the opposite direction, the plug moves progressively away from the seat, opening a continuous channel defined by the first passageway and continuous channel extending through the plug.

8. The phase separation centrifuge tube according to claim 6, wherein the continuous channel of the plug of ii) comprises a first and second section, wherein the first section extends from the inlet and the second section extends to the outlet.

9. The phase separation centrifuge tube according to claim 8, wherein the second section of the channel is not coaxial with the first passageway and both the second section of the channel and the first passageway are substantially parallel with the longitudinal axis of the tube, such that when the plug is moved progressively away from the seat in a valve-open position, a cavity is formed between the plug and a wall of the first passageway, and a continuous passage is defined from the cavity of the tube, the cavity formed between the plug and the wall of the first channel, and the channel of the plug, such that fluid may flow from the cavity of the tube and out of the outlet of the plug.

10. The phase separation centrifuge tube according to claim 1, wherein the second section of the passageway comprises a valve seat and is configured to engage with the plug such that when in the valve-open position, a cavity is formed between the plug and the wall of the second section of passageway, and a continuous passage is defined from the cavity of the tube, the cavity formed between the plug and the wall of the second section of the first passageway, and the channel of the plug, such that fluid may flow from the cavity of the tube and out of the outlet of the plug.

11. The phase separation centrifuge tube according to claim 1, wherein the fluid control valve further comprises a gasket disposed on the plug and/or a valve seat, such that when in the valve closed position, the gasket acts to provide an additional seal between the plug and first passageway.

12. The phase separation centrifuge tube according to claim 1, wherein the tube further comprise a removable cap which is capable of being releasably attached to the inlet of the tube, optionally wherein the cap comprises a thread on its inner surface that corresponds to a thread on the external surface of the inlet of the tube such that, when the cap is rotated about the inlet, it fits sealingly to prevent liquid disposed in the cavity of the tube from leaking out of the inlet.

13. A method of extracting a single fluid phase from an immiscible fluid sample, the method comprising:

i) introducing an immiscible fluid sample comprising immiscible fluid phases to the phase separation centrifuge tube according to claim 1;

ii) mixing the immiscible fluid phases in the tube;

iii) separating the immiscible fluid phases by centrifuging the tube; and iv) extracting a fluid phase separated by step iii) by opening the fluid control valve of the tube to allow a separated fluid phase sample to flow therethrough, and closing the fluid control valve once the separated fluid phase sample has been removed from the tube, thereby extracting a single fluid phase, or by engaging an extraction means with the outlet and generating a negative pressure in the first passageway, when compared to the cavity, resulting in the flow of fluid from the cavity, into the first passageway and out of the outlet of the tube.

* * * * *